(12) United States Patent
Yang et al.

(10) Patent No.: US 12,078,556 B2
(45) Date of Patent: Sep. 3, 2024

(54) CAPACITIVE FLEXIBLE TACTILE SENSOR BASED ON GRADED INCLINED MICRO-CYLINDER STRUCTURE

(71) Applicant: ANHUI UNIVERSITY, Anhui (CN)

(72) Inventors: Liangpan Yang, Anhui (CN); Xiaohui Guo, Anhui (CN); Siliang Wang, Anhui (CN); Zhiliang Chen, Anhui (CN); Pengbin Gui, Anhui (CN); Wei Zeng, Anhui (CN); Lixia Yang, Anhui (CN); Yaohua Xu, Anhui (CN); Zhixiang Haung, Anhui (CN)

(73) Assignee: ANHUI UNIVERSITY, Anhui (CN)

( * ) Notice: Subject to any disclaimer, the term of this patent is extended or adjusted under 35 U.S.C. 154(b) by 263 days.

(21) Appl. No.: 17/798,087

(22) PCT Filed: Dec. 31, 2021

(86) PCT No.: PCT/CN2021/144026
§ 371 (c)(1),
(2) Date: Aug. 8, 2022

(87) PCT Pub. No.: WO2023/065540
PCT Pub. Date: Apr. 27, 2023

(65) Prior Publication Data
US 2023/0296453 A1    Sep. 21, 2023

(30) Foreign Application Priority Data
Oct. 18, 2021   (CN) .......................... 202111211504.4

(51) Int. Cl.
*G01L 1/14*          (2006.01)
(52) U.S. Cl.
CPC .................... *G01L 1/142* (2013.01)

(58) Field of Classification Search
None
See application file for complete search history.

(56) References Cited

U.S. PATENT DOCUMENTS 4,266,263 A  *  5/1981  Haberl .................... G01L 1/146
                                                            361/278

FOREIGN PATENT DOCUMENTS

| CN | 106813811 | 6/2017 |
| CN | 107894293 | * 4/2018 |

(Continued)

OTHER PUBLICATIONS

"International Search Report (Form PCT/ISA/210) of PCT/CN2021/144026," mailed on Jul. 20, 2022, pp. 1-5.

(Continued)

*Primary Examiner* — Brandi N Hopkins
*Assistant Examiner* — Nigel H Plumb
(74) *Attorney, Agent, or Firm* — JCIPRNET (57) ABSTRACT

A capacitive flexible tactile sensor based on graded inclined micro-cylindrical structure, includes an upper electrode layer, a lower electrode layer and a dielectric layer between them. The dielectric layer is composed of an upper dielectric layer and a lower dielectric layer. The upper dielectric layer includes an upper dielectric layer base, upper dielectric layer long micro-cylinders and upper dielectric layer short micro-cylinders. The lower dielectric layer includes lower dielectric layer base, lower dielectric layer long micro-cylinder and lower dielectric layer short micro-cylinder. The upper dielectric layer long micro-cylinders and the lower dielectric layer long micro-cylinders are closely bonded, and there is a distance between the upper dielectric layer short micro-cylinder and the lower dielectric layer short micro-cylinder. The sensor structure of the present application is stable, overcomes the viscous effect.

10 Claims, 9 Drawing Sheets

(56) References Cited

FOREIGN PATENT DOCUMENTS

| | | | |
|---|---|---|---|
| CN | 111352525 | * | 6/2020 |
| CN | 111533081 | | 8/2020 |
| CN | 111982162 | | 11/2020 |
| CN | 113218539 | * | 8/2021 |
| JP | 2012026905 | | 2/2012 |

OTHER PUBLICATIONS

"Written Opinion of the International Searching Authority (Form PCT/ISA/237) of PCT/CN2021/144026," mailed on Jul. 20, 2022, pp. 1-4.

* cited by examiner

CAPACITIVE FLEXIBLE TACTILE SENSOR BASED ON GRADED INCLINED MICRO-CYLINDER STRUCTURE

CROSS-REFERENCE TO RELATED APPLICATION

This application is a 371 of international application of PCT application serial no. PCT/CN2021/144026, filed on Dec. 31, 2021, which claims the priority benefit of China application no. 202111211504.4, filed on Oct. 18, 2021. The entirety of each of the above mentioned patent applications is hereby incorporated by reference herein and made a part of this specification.

The present application claims priority to Chinese patent application NO. 202111211504.4, filed to the Chinese Patent Office on Oct. 18, 2021, entitled "A capacitive flexible tactile sensor based on graded inclined micro-cylinder structure", the entire disclosure of which is incorporated herein by reference.

TECHNICAL FIELD

The application relates to the field of sensor technology, and in particular to a capacitive flexible tactile sensor based on graded inclined micro-cylinder structure.

BACKGROUND ART

With the continuous development of sensing technology and artificial intelligence, intelligent robots are developing in the direction of health monitoring and human-computer interaction. Tactile perception is an important way for robots to interact with external information. Flexible tactile sensors are directly and widely used in intelligent robots, electronic skin and other fields.

Based on the wide application of intelligent robots in industry and the high-precision operation requirements of intelligent robots in special industries, as one of the key components of intelligent robots, tactile sensors have higher and higher requirements for dynamic response, sensitivity, and structural stability of tactile sensors. Therefore, scholars at home and abroad also put forward higher requirements for the performance of the tactile sensor studied, such as higher sensitivity, lower detection limit, shorter response/recovery time, and lower power consumption.

According to the sensing mechanism of tactile sensor, it can be divided into capacitive sensor, piezoresistive sensor, piezoelectric sensor, etc. Wherein, capacitive sensors have become a research hotspot in recent years due to their advantages of good dynamic response, simple structure, low power consumption, good stability, low cost, and insensitivity to temperature, but it is difficult to design a novel structure with excellent performance.

At present, the following aspects of capacitive tactile sensors at home and abroad need to be improved.

The microstructure dielectric layer of the existing capacitive tactile sensor, for example, pyramid, cone and other structures are used, is distributed in an array in the dielectric layer. Because the existence of the microstructure tip will improve the sensitivity of the sensor, the tip of the microstructure in the dielectric layer is easily deformed when subjected to force, so that the dielectric constant and the distance between the electrodes will change rapidly. But the adhesion between the tip and its connecting layer is not strong enough. The tip is easily damaged and slips when subjected to force. Therefore, the microstructure medium layer and the electrode layer of the existing capacitive tactile sensor cannot be closely bonded, and there is a slip factor, which limits the popularization and application of the capacitive tactile sensor.

The traditional capacitive tactile sensor pursues the minimum detection limit of the sensor during research, and it is necessary to continuously miniaturize the microstructure of the dielectric layer, to reduce the maximum pressure limit that the sensor can withstand, resulting in a smaller detection range and lower detection limit. For example, a known flexible capacitive pressure sensor based on an inclined micro-cylinder array has a lower detection limit of 1 Pa. Another known flexible capacitive pressure sensor based on a porous pyramid dielectric layer has an ultra-low detection limit of 0.14 Pa. Therefore, it is difficult for the existing capacitive tactile sensor to have a small detection limit and a wide detection range at the same time, and it will fail under the action of a slightly larger pressure, resulting in a limited application range.

SUMMARY OF THE APPLICATION

The purpose of this application is to provide a capacitive flexible tactile sensor based on graded inclined micro-cylindrical structure.

In order to achieve the above purpose, the application provides the following technical solutions:

A capacitive flexible tactile sensor based on graded inclined micro-cylindrical structure, includes an upper electrode layer, a lower electrode layer and a dielectric layer between them.

The dielectric layer is composed of an upper dielectric layer and a lower dielectric layer, and the upper dielectric layer and the lower dielectric layer are vertically symmetrically distributed in the dielectric layer.

The upper dielectric layer includes an upper dielectric layer base, several upper dielectric layer long micro-cylinders and several upper dielectric layer short micro-cylinders. The upper dielectric layer base is closely bonded to the lower side of the upper electrode layer. The upper dielectric layer long micro-cylinders and the upper dielectric layer short micro-cylinders are staggered and equally spaced at the bottom of the upper dielectric layer base.

The lower dielectric layer includes a lower dielectric layer base, lower dielectric layer long micro-cylinders and lower dielectric layer short micro-cylinders. The lower dielectric layer base is closely bonded to the upper side of the lower electrode layer. The lower dielectric layer long micro-cylinder and the lower dielectric layer short micro-cylinder are staggered and equally spaced at the top of the lower dielectric layer base.

The upper dielectric layer long micro-cylinders and the lower dielectric layer long micro-cylinders are closely bonded, and there is a distance between the upper dielectric layer short micro-cylinder and the lower dielectric layer short micro-cylinder.

The present application is based on a capacitive flexible tactile sensor with a graded inclined micro-cylindrical structure. The dielectric layer is designed to be composed of two parts, an upper dielectric layer and a lower dielectric layer, which have the structure of graded micro-cylinder array respectively, namely the structure of long micro-cylinder and short micro-cylinder. Compared with the traditional tactile sensor structure, under the same force condition, the structure has higher initial sensitivity. At the same time, it has the characteristics of good stability, strong deformation ability and good repeatability.

Based on the above structure, the flexible tactile sensor of the present application also realizes three stress stages.

The first stage is that the upper dielectric layer long micro-cylinder and the lower dielectric layer long micro-cylinder are squeezed to produce bending deformation. The gap between the electrodes is reduced rapidly, and the air in the micro-cylinder gap is expelled. The dielectric constant of the capacitor increases rapidly, so the capacitance value increases rapidly.

The second stage is that the upper dielectric layer short micro-cylinder and the lower dielectric layer short micro-cylinder are squeezed to produce bending deformation after contact. The upper dielectric layer long micro-cylinder of the and the lower dielectric layer long micro-cylinder continue to be squeezed to produce bending deformation. The spacing between the electrodes is reduced more rapidly, and the air in the micro-cylinder gap is expelled. The dielectric constant of the capacitor increases more rapidly, so the capacitance value continues to increase more rapidly.

The third stage is that the upper dielectric layer short micro-cylinder and the lower dielectric layer short micro-cylinder are squeezed to produce compression deformation. The upper dielectric layer long micro-cylinder and the lower dielectric layer long micro-cylinder are squeezed to produce compression deformation. The spacing between the electrodes is slowly reduced, and the air in the micro-cylinder gap is expelled. The dielectric constant of the capacitor increases slowly, so that the capacitance value continues to increase slowly.

Since the change of the capacitance value can reflect the force on the sensor, it can provide accurate and timely feedback for the intelligent robot. The capacitive flexible tactile sensor with the phase-deformation of the dielectric layer of the present application has excellent performance. Compared with the traditional flexible tactile sensor, the dielectric layer of the present application is more prone to bending deformation, and has higher sensitivity and shorter response/recovery time, lower hysteresis, better stability.

BRIEF DESCRIPTION OF DRAWING

The present application will be further described below with reference to the accompanying drawings and embodiments.

Wherein: 1. upper electrode layer, 11. upper substrate, 12. upper electrode, 2. lower electrode layer, 21. lower substrate, 22. lower electrode, 31. upper dielectric layer, 311. upper dielectric layer base, 312. upper dielectric layer long micro-cylinders, 313. upper dielectric layer short micro-cylinders, 32. lower dielectric layer, 321. lower dielectric layer base, 322. lower dielectric layer long micro-cylinders, 323. lower dielectric layer short micro-cylinders.

DETAILED DESCRIPTION OF THE EMBODIMENTS

In order to make the technical solutions and advantages of the embodiments of the present application clearer, the following will describe the technical solutions in the embodiments of the present application more clearly and completely with reference to the drawings in the embodiments of the present application. Obviously, the described embodiments are a part of the embodiments of the present application, rather than all the embodiments. Based on the embodiments of the present application, all other embodiments obtained by a person of ordinary skill in the art without creative work shall fall within the protection scope of the present application.

Refer to FIGS. 1, 2, 3 and 4, in a preferred embodiment of this application, a capacitive flexible tactile sensor based on graded inclined micro-cylindrical structure, includes: an upper electrode layer 1, a lower electrode layer 2, an upper dielectric layer 31 and a lower dielectric layer 32. The upper dielectric layer 31 includes an upper dielectric layer base 311, an upper dielectric layer long micro-cylinder 312, and an upper dielectric layer short micro-cylinder 313. The lower dielectric layer 32 includes a lower dielectric layer base 321, a lower dielectric layer long micro-cylinder 322, and a lower dielectric layer short micro-cylinder 323. The upper dielectric layer 31 on the lower side of the upper electrode layer 1 has a hierarchical micro-cylindrical array with an inclination angle of 30°, and the upper dielectric layer 31 is closely bonded to the upper electrode layer 1. The lower dielectric layer 32 on the upper side of the lower electrode layer 2 has a hierarchical micro-cylindrical array with an inclination angle of 30°, and the lower dielectric layer 32 is closely bonded to the lower electrode layer 2. The upper dielectric layer long micro-cylinder 312 and the lower dielectric layer long micro-cylinder 322 are closely bonded. There is a distance between the upper dielectric layer short micro-cylinder and the short lower dielectric layer micro-cylinders. The upper dielectric layer 31 and the lower dielectric layer 32 are vertically symmetrical in the dielectric layer.

Refer to FIGS. 1, 2, 3 and 4, the upper electrode layer 1 includes an upper substrate 11 and an upper electrode 12. The upper substrate 11 is located on the top surface of the upper electrode 12, and the upper substrate 11 and the upper electrode 12 are closely bonded. The lower electrode layer 2 includes a lower substrate 21 and a lower electrode 22. The lower substrate 21 is located on the bottom surface of the lower electrode 22, and the lower substrate 21 and the lower electrode 22 are closely bonded. The upper electrode 12 and the lower electrode 22 are arranged in parallel, and the upper substrate 11 and the lower substrate 21 are arranged in parallel. The upper substrate 11 and the lower substrate 21 are made of thin layers made of silicone rubber, which has excellent insulation and hyperelasticity. The dimensions of the upper substrate 11 and the lower substrate 21 are kept consistent. The upper substrate 11 and the lower substrate 21 are respectively bonded to the top surface of the upper electrode 12 and the bottom surface of the lower electrode 22 with silicone rubber, and the upper substrate 11 and the lower substrate 21 are the shielding protection layers of the sensor.

Refer to FIGS. 1, 2, 3 and 4, the upper electrode 12 and the lower electrode 22 are thin layers made of commercial conductive silver glue flexible conductor material. The upper electrode 12 and the lower electrode 22 are closely bonded with the materials of other layers of the sensor, so that the structure of the sensor is more stable, and has durability and flexibility. The upper electrode 12 and the lower electrode 22 are both cuboid structures, and the dimensions of the electrodes are kept consistent. The upper electrode 12 and the lower electrode layer 2 are arranged in parallel. Both the upper electrode 12 and the lower electrode 22 need to be drawn out by a metal wire (conductor) generally, and the metal here includes gold, silver, copper, and the like.

Refer to FIGS. 1, 2, 5, 7, 8 and 9, the upper dielectric layer 31 and the lower dielectric layer 32 are both made of PDMS (polydimethylsiloxane), which has excellent insulation and super elasticity, and forms the dielectric layer together with the air in the micro-cylindrical gap of the dielectric layer. The parts of the upper dielectric layer 31 and the lower dielectric layer 32 that are not bonded to the electrode layers are all in the air.

Figure 1:
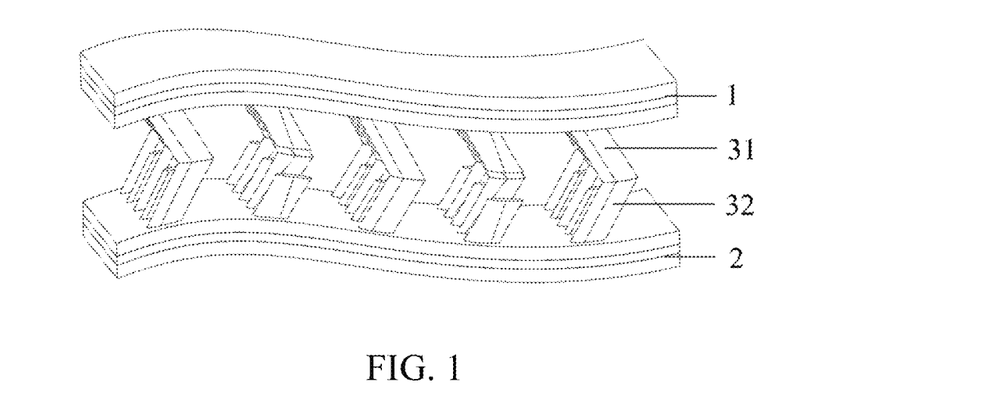
FIG. 1 is a perspective view of the overall structure of an embodiment of the present application.
Figure 2:
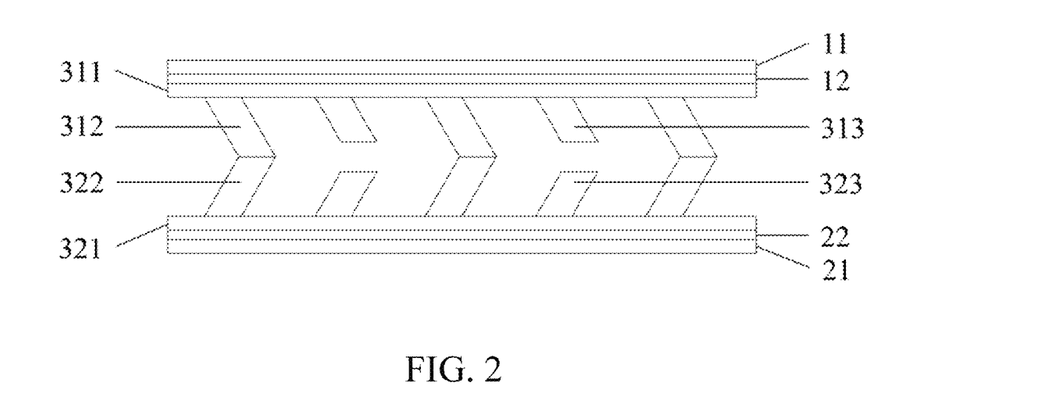
FIG. 2 is a front view of the overall structure of an embodiment of the present application.
Figure 3:
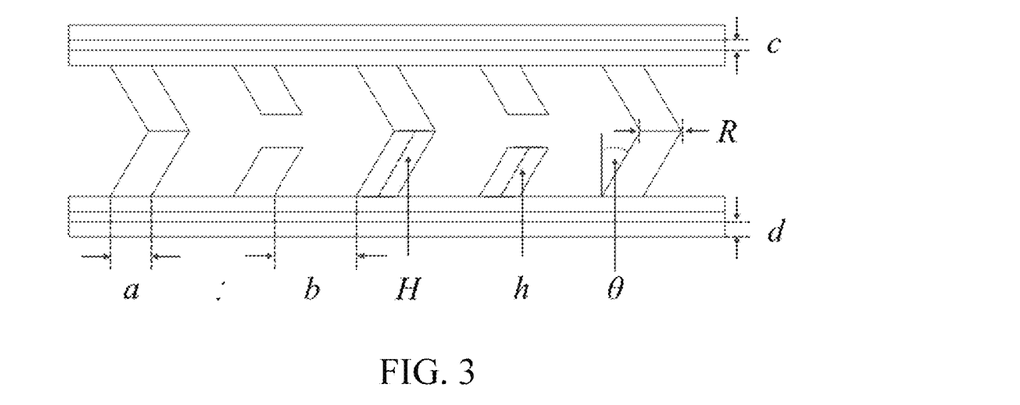
FIG. 3 is a schematic parameter diagram of the overall structure of an embodiment of the present application.

In this preferred embodiment, the upper dielectric layer long micro-cylinder 312, the lower dielectric layer long micro-cylinder 322, the upper dielectric layer short micro-cylinder 313, and the lower dielectric layer short micro-cylinder 323 all adopt cylindrical structures. Not limited to this, the structures of the upper dielectric layer long micro-cylinder 312, the upper dielectric layer short micro-cylinder 313, the lower dielectric layer long micro-cylinder 322, and the lower dielectric layer short micro-cylinder 323 can also be any one of prism, prismoid, bionic structure and the like.

The upper dielectric layer long micro cylinder 312, the lower dielectric layer long micro cylinder 322, the upper dielectric layer short micro cylinder 313, and the lower dielectric layer short micro cylinder 323 are distributed between the electrodes to form a capacitor. The upper dielectric layer long micro-cylinders 312 and the upper dielectric layer short micro-cylinders 313 are staggered and equally arranged on the upper dielectric layer 31, and the top surface of the upper dielectric layer 31 is bonded to the bottom surface of the upper electrode 12. The lower dielectric layer long micro-cylinders 322 and the lower dielectric layer short micro-cylinders 323 are staggered and equally distributed in the lower dielectric layer 32, and the bottom surface of the lower dielectric layer 32 is bonded to the top surface of the lower electrode 22.

Figure 4:
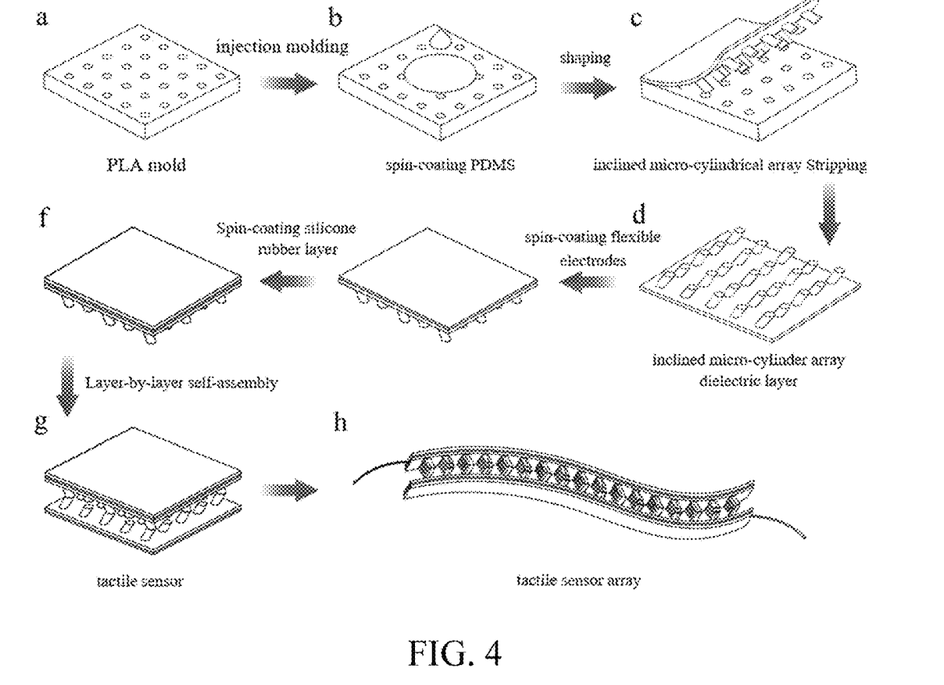
FIG. 4 is a schematic diagram of the preparation process of an embodiment of the present application.

Refer to FIG. 4, a preparation scheme of a capacitive flexible tactile sensor based on graded inclined micro-cylindrical structure of the present application, has the following steps:

First, the 3D CAD design software SolidWorks 2019 is used for modeling to design the dielectric layer and electrode mold used in this application. Based on the 3D printing process, a 3D printer was used to print a medium layer mold with a graded inclined micro-cylindrical structure from PLA, as shown in a of FIG. 4.

The polydimethylsiloxane main agent and the crosslinking agent are mixed at the mass ratio of 10:1, spin-coated on the mold at a speed of 5000 rpm for 90 s, as shown in b of FIG. 4.

The assembly is put into a vacuum chamber for 10 min. The air in the cavity was extracted. Then, the assembly is put into a vacuum drying oven at 60° C. for curing for 3 h, and demolded after curing, as shown in c of FIG. 4. A flexible upper dielectric layer 31 and a lower dielectric layer 32 are prepared, as shown in d of FIG. 4.

The commercial conductive silver paste is spin-coated on the mold at a speed of 5000 rpm for 30 s, and then placed in a vacuum drying oven at 60° C. for curing for 1 h, to form an upper dielectric layer 31 containing the upper electrode 12 and a lower dielectric layer 32 containing the lower electrode 22, as shown in e of FIG. 4.

The silicone rubber is spin-coated on the mold at a speed of 5000 rpm for 60 s, then the assembly is placed in a vacuum chamber for 10 min, the air is extracted from the cavity. Then the assembly is placed in a vacuum drying oven at 60° C. for curing for 2 h. after curing, demolding is performed to form the prepared flexible upper substrate 11 and lower substrate 21.

The flexible upper substrate 11 and the lower substrate 21 are respectively bonded to the top surface of the upper dielectric layer 31 containing the upper electrode 12 and the bottom surface of the lower dielectric layer 32 containing the lower electrode 22 with silicone rubber, as shown in f of FIG. 4, after it is fully cured, align it up and down along the edge, use PDMS to bond the upper and the lower dielectric layer long micro-cylinder 322 (including the upper dielectric layer long micro-cylinder 312 and the lower medium layer long micro cylinder 322), the whole sensor is fully cured After that, a firm high-sensitivity capacitive flexible tactile sensor is formed, as shown in FIG. g of FIG. 4.

Embodiment 1

This embodiment is a flexible tactile sensor with a 5×5 micro-cylindrical unit structure prepared according to the above preparation method. Specifically, the height (H) of the long micro-cylinder (including the upper dielectric layer long micro-cylinder 312 and the lower dielectric layer long micro-cylinder 322) is 3 mm. The thickness (c) of the upper substrate 11 and the lower substrate 21 is 0.8 mm, the lengths and widths of which are both 24 mm. The thicknesses of the upper dielectric layer base 311 and the lower dielectric layer base 321 are both 0.8 mm. The thicknesses (d) of the upper electrode and the lower electrode 22 are both 0.3 mm, and the lengths and widths of which are both 24 mm. The diameters (R) of the micro-cylinders remain unchanged at 1.6 mm. Through the design and optimization of different microstructures, the ratio of micro-cylinder diameter to spacing (a:b), the heights (h) of short micro-cylinders (including the upper dielectric layer short micro cylinder 313 and the lower dielectric layer short micro cylinder 323), and the inclination angle of micro-cylinders (θ), the optimal sensor microstructure parameters are obtained to improve the sensitivity of the sensor.

Figure 5:
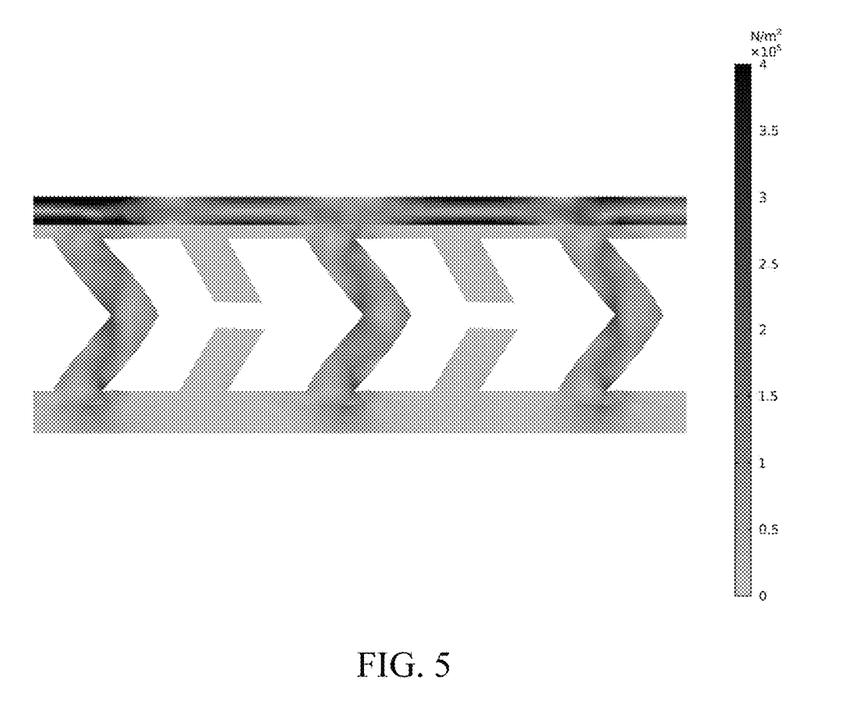
FIG. 5 is a schematic diagram of a two-dimensional stress distribution in the first stage of deformation of an embodiment of the present application.
Figure 6:
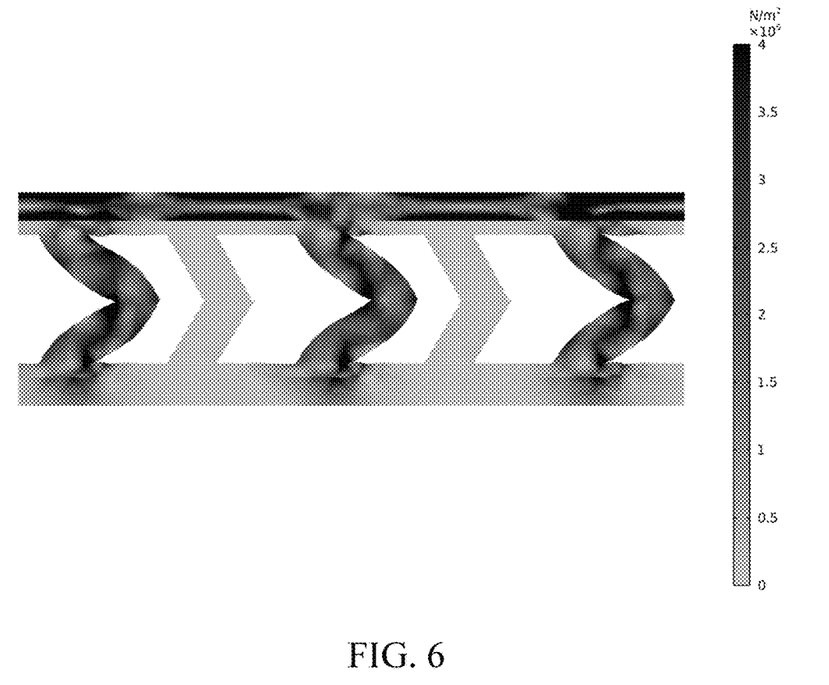
FIG. 6 is a schematic diagram of two-dimensional stress distribution in the second stage of deformation of an embodiment of the present application.
Figure 7:
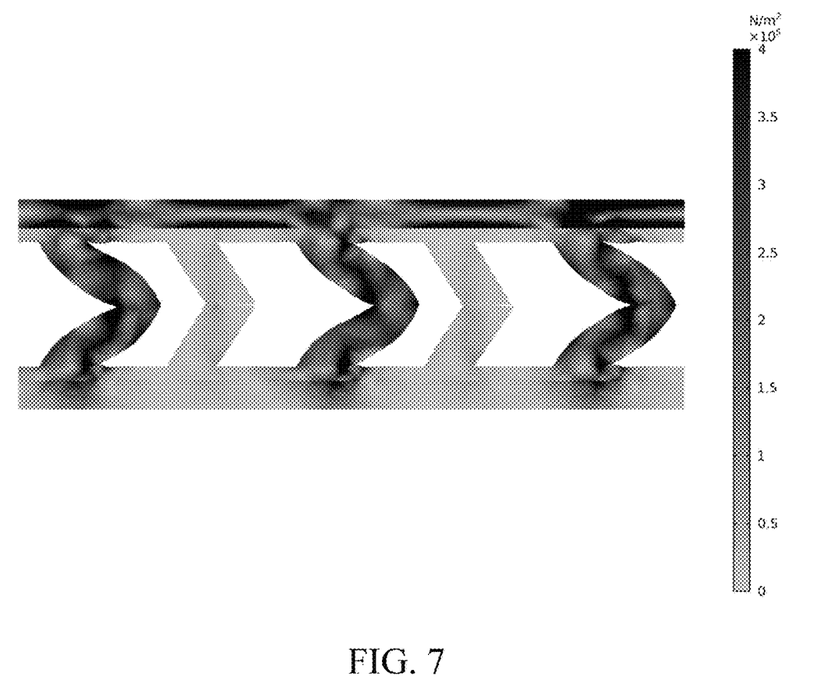
FIG. 7 is a schematic diagram of two-dimensional stress distribution in the third stage of deformation of an embodiment of the present application.

The COMSOL-based 2D finite element simulation results of the sensor of an embodiment of the present application are as follows. FIG. 5, FIG. 6, FIG. 7 respectively show schematic diagrams of two-dimensional stress distribution of an embodiment of the present application. Simulation images verify the deformation of the dielectric layer in three different stages after the sensor is stressed.

Figure 8:
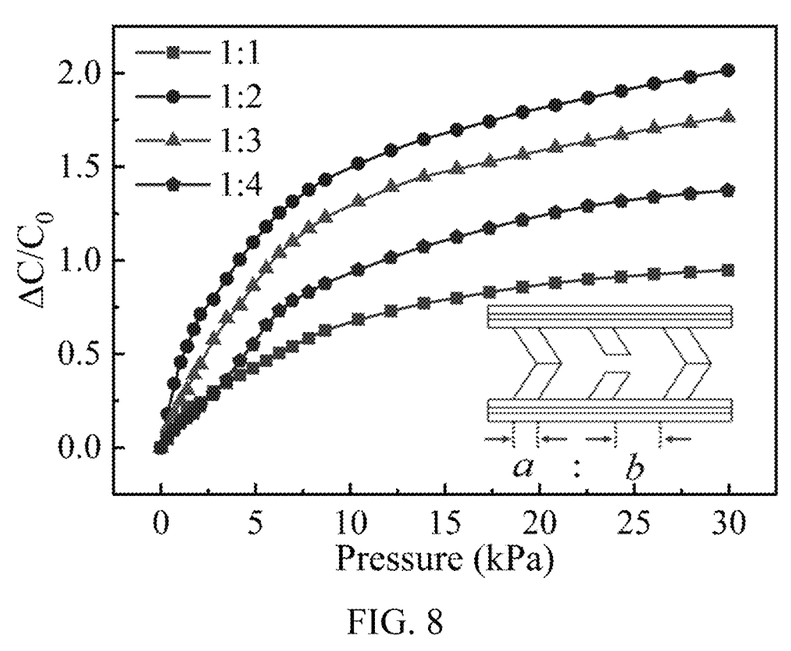
FIG. 8 is a schematic diagram of the relationship between the signal output and the loading force in different embodiments of the present application with different ratios of the diameter to the spacing of the micro-cylinders.

FIG. 8 shows the relationship between the signal output and the loading force of the tactile sensor with different ratios of the diameter to the spacing of the micro-cylinders. In order to study the effect mechanism of this parameter on the sensing performance, sensors containing four different graded inclined micro-cylinder structures were prepared, wherein h was 2.25 mm, θ was kept constant at 30°, and these sensors are only differed in the spacing between the micro-cylinders. With the further increase of the micro-cylinder spacing, although the compressibility of the dielectric layer increases, the dielectric constant between the electrodes changes limitedly. The experimental results show that there is a big difference in the relative capacitance changes between graded micro-cylinders with different spacings. When the ratio of the diameter of the micro-cylinder (the upper dielectric layer long micro-cylinder 312, the upper dielectric layer short micro-cylinder 313, the lower dielectric layer long micro-cylinder 322, and the lower dielectric layer short micro-cylinder 323) to the center distance is 1:2, the relative capacitance changes the most, and the sensitivity of the sensor is the highest at this time.

Figure 9:
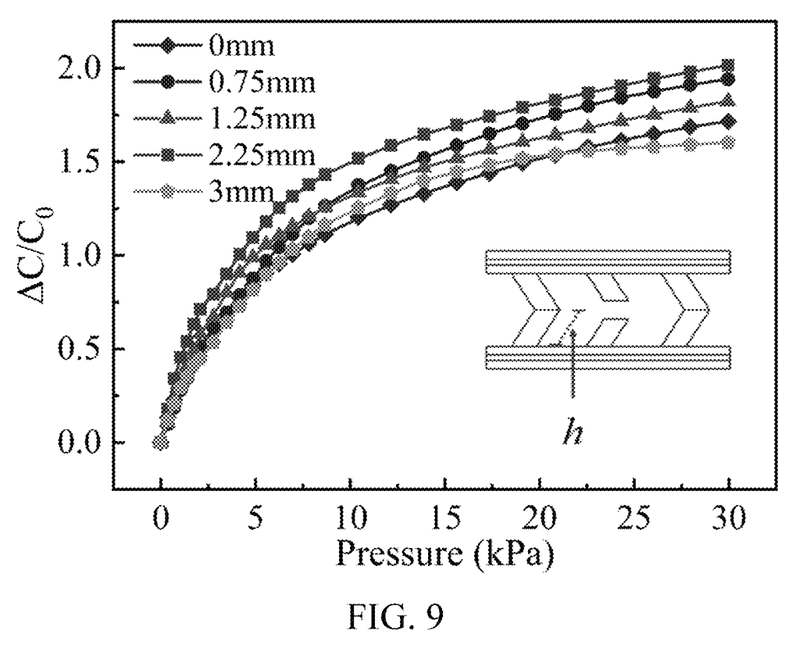
FIG. 9 is a schematic diagram of the relationship between the signal output and the loading force in different embodiments of the present application with different heights of short micro-cylinder.

FIG. 9 shows the relationship between the signal output and the loading force in different embodiments with different heights of short micro-cylinder (including the upper dielectric layer short micro cylinder 313 and the lower dielectric layer short micro cylinder 323). θ is 30°, a:b is 1:2 parameter unchanged. The height of the long micro-cylinder (including the upper dielectric layer long micro cylinder 312 and the lower dielectric layer long micro cylinder 322) of the sensor is 3 mm, and the height of the short micro-cylinder (including the upper dielectric layer short micro cylinder 313 and the lower dielectric layer short micro cylinder 323) is changed. It can be seen from the figure that, when the height of the short micro-cylinders (the upper dielectric layer short micro-cylinder 313 and the lower dielectric layer short micro-cylinder 323) is 2.25 mm, the relative capacitance of the sensor changes the most.

Figure 10:
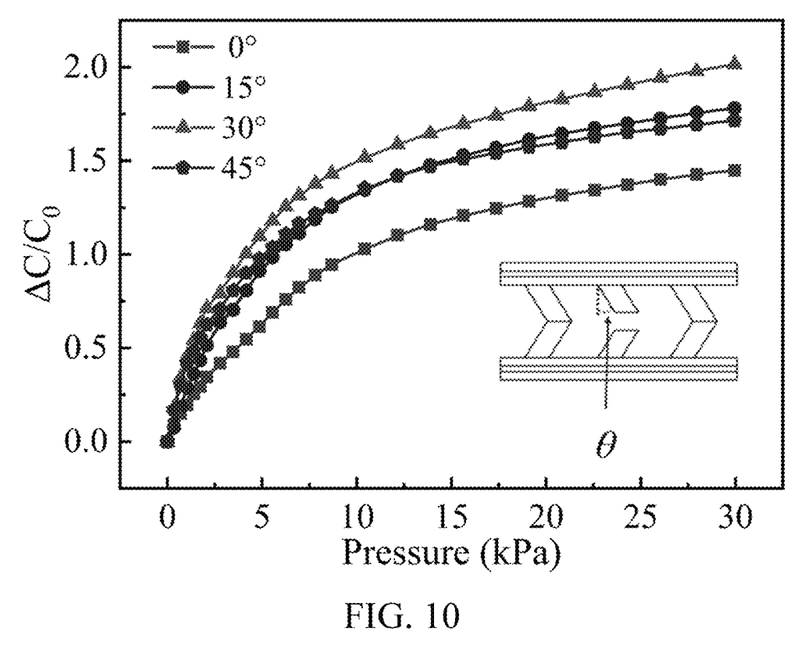
FIG. 10 is a schematic diagram of the relationship between the signal output and the loading force in different embodiments of the micro-cylinder inclination angle of the present application.

FIG. 10 shows the relationship between the signal output and the loading force in the tactile sensors of different micro-cylinder inclination angles. When keeping h at 2.25 mm and a:b at 1:2 unchanged, the results show that, compared with other inclination angles, the micro-cylinder with a 30° inclination angle will change the relative capacitance change to a greater extent, and the sensor exhibits the highest sensitivity.

Through multiple sets of comparative experiments, combined with the sensitivity and detection limit of the sensor, the structural parameters of the sensor of the graded inclined micro-cylinder are determined. When the ratio of the diameter of the micro-cylinder to the center distance is 1:2, the height of the short micro-cylinder (including the upper dielectric layer short micro-cylinder 313 and the lower dielectric layer short micro cylinder 323) is 2.25 mm, and the inclination angle of the micro-cylinder is 30°, the tactile sensor shows better sensing performance.

Figure 11:
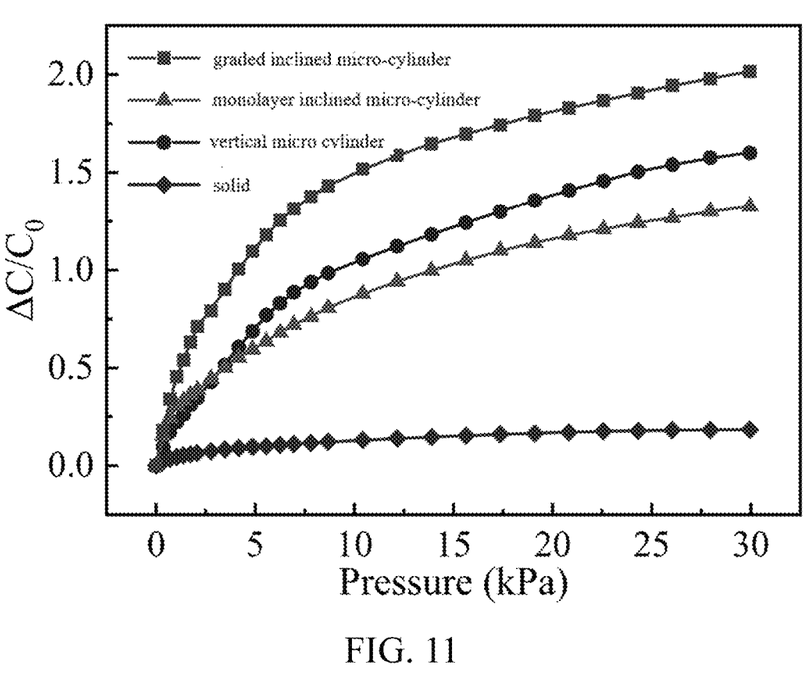
FIG. 11 is a schematic diagram of the relationship between the signal output and loading force of tactile sensors of an embodiment of the present application and different structures.

FIG. 11 shows the relationship between the signal output and loading force of tactile sensors with different microstructures. Compared with the sensors of single-layer inclined micro-cylinder, vertical micro-cylinder and solid structure, the relative capacitance of the sensor using the graded inclined micro-cylinder as the dielectric layer is more obvious. The results show that the sensor with graded inclined micro-cylindrical structure has higher sensitivity.

Figure 12:
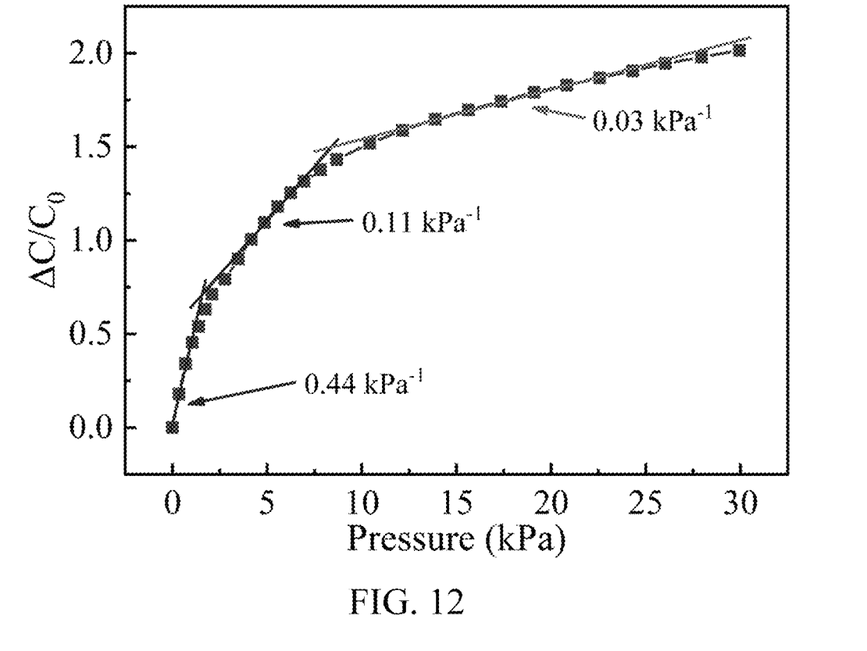
FIG. 12 is a schematic diagram of the relationship between the relative capacitance change and the loading force of an embodiment of the present application.

FIG. 12 is a graph showing the sensitivity curve of the graded inclined micro-cylindrical structure tactile sensor. Tactile sensor sensitivity is mainly divided into three stages: the first stage is from 0 Pa to 1000 Pa, the sensitivity is about 0.44 kPa$^{-1}$; the second stage is from 1 kPa to 10 kPa, the sensitivity is about 0.11 kPa$^{-1}$; and the third stage is 10 kPa to 30 kPa, the sensitivity is about 0.03 kPa$^{-1}$. The experimental results prove the feasibility and performance of the structure. Compared with the traditional tactile sensor, the structure has higher sensitivity.

Figure 13:
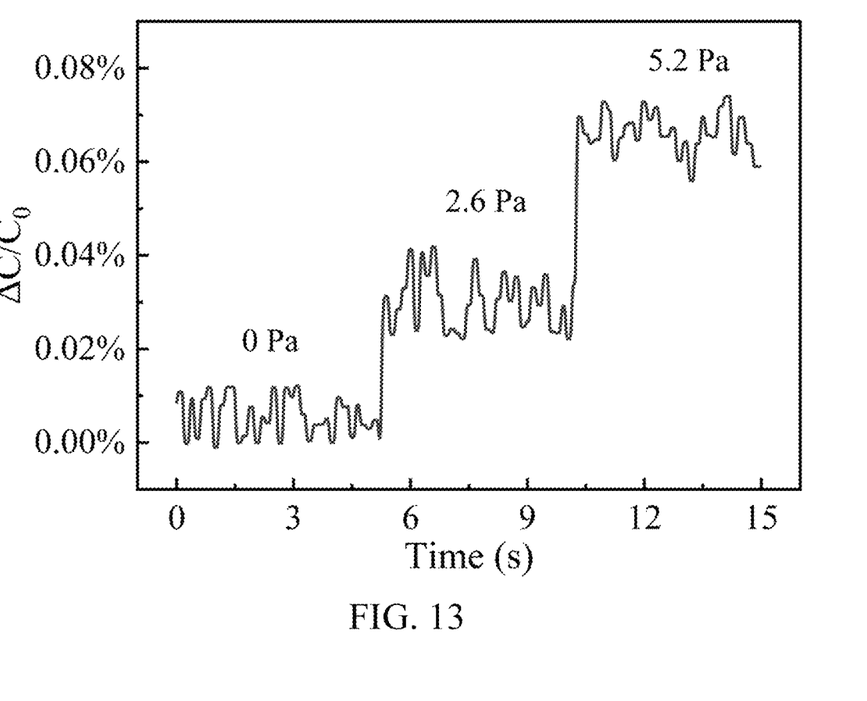
FIG. 13 is a response curve detecting an ultra-light object (2.6 Pa) of an embodiment of the present application.

FIG. 13 is a response curve detecting an ultra-light object (2.6 Pa). It can be seen from the graph of the experimental results that, when the object is placed on the sensor surface, its output capacitance value changes instantaneously, and the result remains within a stable value region. It shows that the sensor has good reliability in high-resolution tactile sensing applications.

Figure 14:
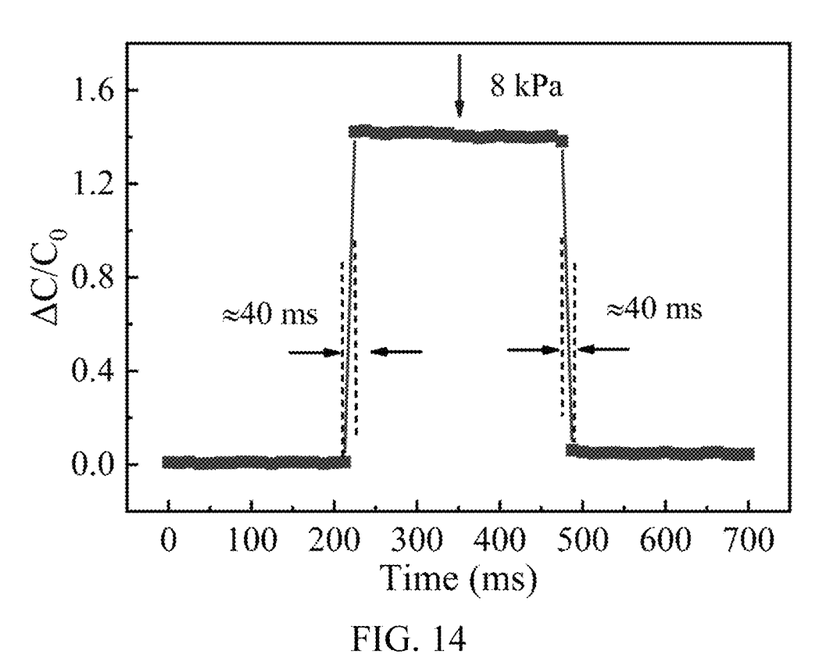
FIG. 14 is a response time test curve of an embodiment of the present application.

FIG. 14 is the response time test curve of the tactile sensor. When a pressure of 8 kPa is applied over the sensor, the relative capacitance of the sensor rapidly increases from minimum to maximum within 40 ms. When pressure is unloaded from the sensor, the sensor has a recovery time of 40 ms. The results show that the prepared tactile sensor has fast response/recovery characteristics, which is mainly attributed to the use of hyperelasticity PDMS and special microstructures in the graded inclined micro-cylinders.

Figure 15:
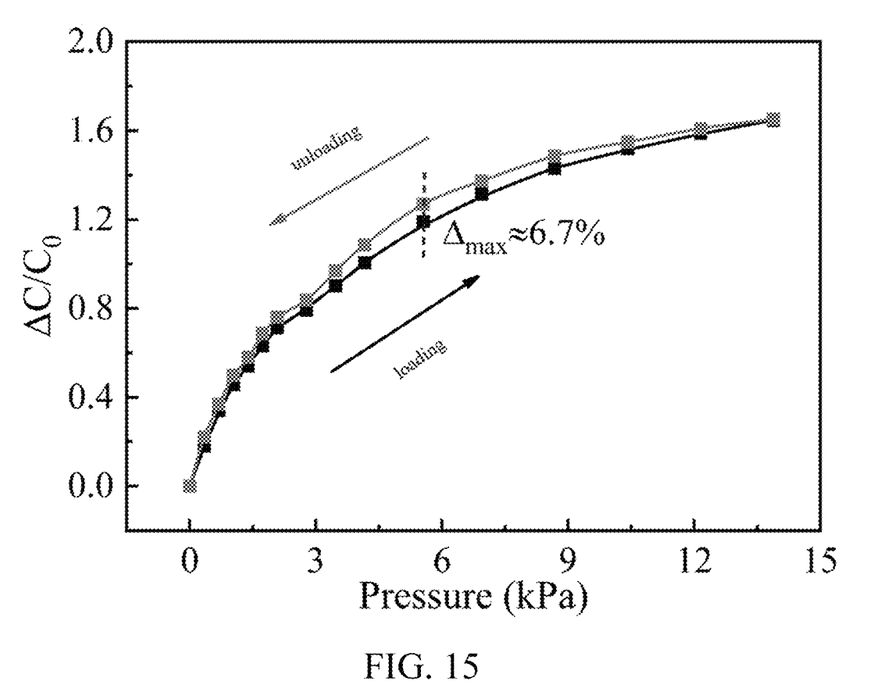
FIG. 15 is a hysteresis test curve of an embodiment of the present application.

FIG. 15 is the hysteresis test curve of the tactile sensor. The hysteresis error of the sensor in the range of 15 kPa was tested. The flexible tactile sensor exhibits a maximum hysteresis error of about 6.7%, indicating that the sensor has low hysteresis.

Figure 16:
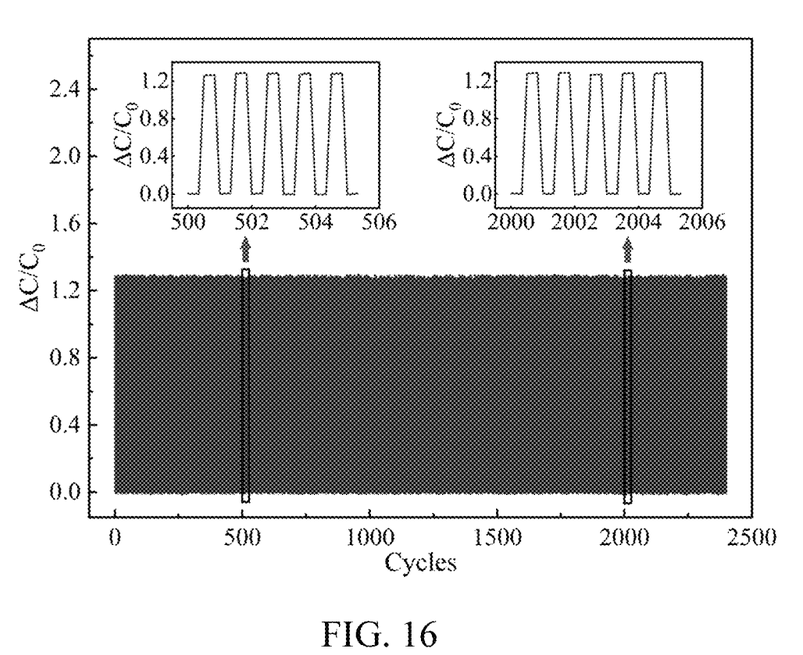
FIG. 16 is a stability test curve during loading/unloading at a pressure of 5 kPa according to an embodiment of the present application.

FIG. 16 is a stability test curve during loading/unloading at a pressure of 5 kPa of the sensor. 5 kPa pressure is dynamic loaded/unloaded, to test sensor durability and repeatability. The illustrations are the 500th to 505th and 2000th to 2005th times of loop loading respectively. The relative capacitance change curve in the figure is basically stable, and the sensor performance is still good. It shows that the sensor has excellent stability and durability.

Figure 17:
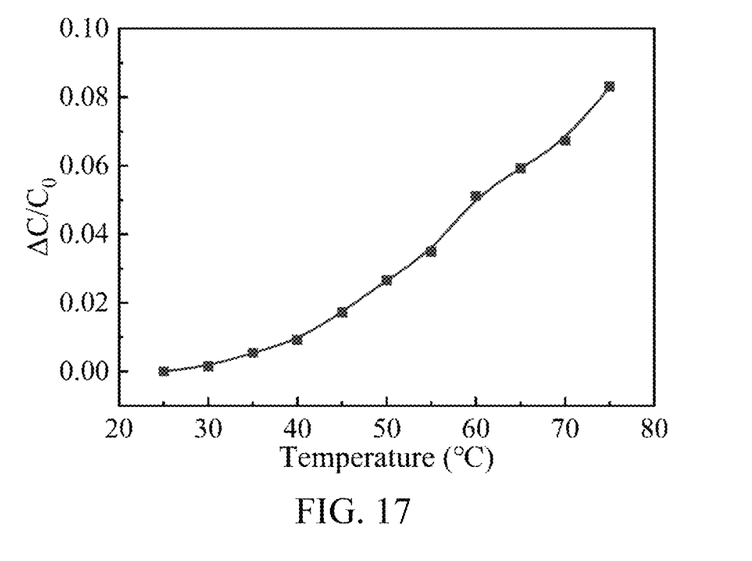
FIG. 17 is a temperature disturbance test chart of an embodiment of the present application.

FIG. 17 is a temperature disturbance test chart of a sensor of the embodiment. According to the experimental data, the maximum interference effect of temperature on the sensor is 0.084. It shows that the temperature has little effect on the sensing characteristics of the sensor proposed in this application.

Figure 18:
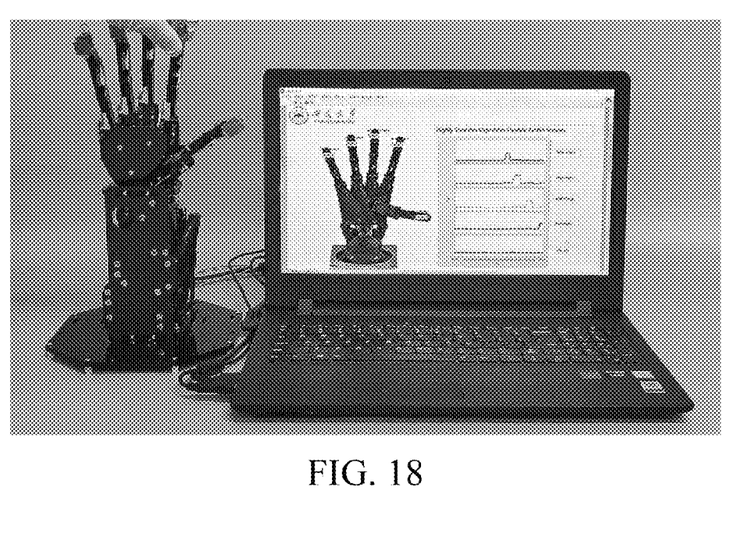
FIG. 18 is a touch experiment integrated on a mechanical finger of an embodiment of the present application.

FIG. 18 is a touch experiment integrated on a manipulator. The sensors are integrated into the five fingers of the manipulator, and the sensor is touched with the finger to achieve the feedback of tactile force. The waveform in the figure clearly shows the capacitance change corresponding to each finger touched, indicating that the tactile sensor has potential application prospects in the human-machine interface.

Embodiment 2

The preparation method of the flexible tactile sensor prepared in Embodiment 2 is the same as that in Embodiment 1, the difference is that the micro-cylinder unit array of the prepared sensor is different. Specifically, the heights (H) of the long micro-cylinders in the dielectric layers (including the upper dielectric layer long micro-cylinder 312 and the lower dielectric layer long micro-cylinder 322) are 3 mm. The thicknesses (c) of the upper substrate 11 and the lower substrate 21 are 0.8 mm. The thicknesses of the upper dielectric layer base 311 and the lower dielectric layer base 321 are both 0.8 mm. The thicknesses (d) of the upper electrode 21 and the lower electrode 22 are both 0.3 mm. The diameters (R) of the micro-cylinders remain unchanged at 1.6 mm. The ratio of the diameter of the micro-cylinder to the spacing is 1:2, the heights of the short micro-cylinders (including the upper dielectric layer short micro-cylinder 313 and the lower dielectric layer short micro-cylinder 323) are 2.25 mm, and the inclination angles of the micro-cylinders remain unchanged at 30°. FIG. h of FIG. 4 shows a flexible tactile sensor with a 7×17 micro-cylindrical unit structure. It is proved that the above designed structure can be extended to a flexible tactile sensor with any m×n micro-cylindrical unit structure.

In this application, by adjusting structural parameters, such as the ratio of the diameter to the pitch of the micro-cylinder, the height of the short micro-cylinder (including the upper dielectric layer short micro-cylinder and the lower dielectric layer short micro-cylinder), the inclination angle of the micro-cylinder, and the number of micro-cylinder array units, and according to the actual application detection requirements, the pressure detection range of the sensor can be dynamically adjusted.

The sensor structure of the present application is stable, and the middle of the upper electrode 12 and the lower electrode 22 is a dielectric layer of a graded inclined micro-cylindrical structure. There are three stages when the tactile sensor is stressed. The first stage is that the upper dielectric layer long micro-cylinder 312 and the lower dielectric layer long micro-cylinder 322 are squeezed to produce bending deformation. The gap between the electrodes is reduced rapidly, and the air in the micro-cylinder gap is expelled. The dielectric constant of the capacitor increases rapidly, so the capacitance value increases rapidly. The second stage is that the upper dielectric layer long micro-cylinder 312 and the lower dielectric layer long micro-cylinder 322 are squeezed to produce bending deformation. The upper dielectric layer short micro-cylinder 313 and the lower dielectric layer short micro-cylinder 323 are squeezed to produce bending deformation after contact. The spacing between the electrodes is reduced more rapidly, and the air in the micro-cylinder gap is expelled. The dielectric constant of the capacitor increases more rapidly, so the capacitance value continues to increase more rapidly. The third stage is that the upper dielectric layer long micro-cylinder 312, the lower dielectric layer long micro-cylinder 322, the upper dielectric layer short micro-cylinder 313 and the lower dielectric layer short micro-cylinder 323 are squeezed to produce compression deformation. The spacing between the electrodes is further reduced, and the air in the micro-cylinder gap is expelled. The dielectric constant of the capacitor increases slowly, so that the capacitance value continues to increase slowly. The magnitude of the pressure can be sensed by measuring the capacitance value. By summarizing and analyzing the experimental data for many times, the capacitance value under the corresponding pressure is calibrated, so that the pressure on the sensor can be calculated according to the capacitance value in practical applications.

Based on the above three stress stages: On the one hand, the long micro-cylinders in the dielectric layer of the present application are prone to bending deformation under the action of low pressure, and this structure endows the sensor with a lower detection limit. Under the action of high pressure, the short and long micro-cylinders between the upper and lower dielectric layer bases are bent and squeezed. And the dielectric layers are made of hyperelastic material polydimethylsiloxane. With the increase of pressure, the capacitance value of the sensor increases slowly, which gives the sensor a wider detection range. Finally, the capacitive flexible tactile sensor based on the graded inclined micro-cylindrical structure of the present application achieves a balance between the detection limit and the detection range, so that the sensor has both a small detection limit and a wide detection range at the same time. On the other hand, the inclined micro-cylindrical structure in the dielectric layer bends and squeezes rapidly when a force is applied. The inclined micro-cylindrical structure in the dielectric layer recovers rapidly when the force is unloaded. Due to the microstructure of the dielectric layer overcoming the hysteresis problem caused by the material, the present application has a lower hysteresis.

Above, as should be understood, it is obvious that the present application is not limited to the details of the above-mentioned exemplary embodiments, and that the present application can be implemented in other specific forms. For example, the design structure based on the dielectric layer is consistent with this product, the structure principle is based on changing the duty ratio of the solid material of the dielectric layer and the air in stages, then changing the distance between the electrodes and the dielectric parameters of the dielectric layer in stages, and the principle of the product is the same as that of this product, and they are all within the scope of protection of this product. This description is only based on preferred independent implementations, but does not limit the implementations in any form. The description in the description is for the sake of clarity. Based on the technical essence of the present application, those skilled in the art should take the description as a whole, and modify or combine the technical solutions in the examples to form other embodiments of the technology in the art, which all belong to the protection scope of the present application.

What is claimed is:

1. A capacitive flexible tactile sensor based on graded inclined micro-cylindrical structure, including an upper electrode layer, a lower electrode layer and a dielectric layer between them;

the dielectric layer is composed of an upper dielectric layer and a lower dielectric layer, and the upper dielectric layer and the lower dielectric layer are vertically symmetrically distributed in the dielectric layer;

the upper dielectric layer includes an upper dielectric layer base, several upper dielectric layer long micro-cylinders and several upper dielectric layer short micro-cylinders; the upper dielectric layer base is closely bonded to the lower side of the upper electrode layer;

the upper dielectric layer long micro-cylinder and the upper dielectric layer short micro-cylinder are staggered and equally spaced at the bottom of the upper dielectric layer base;

the lower dielectric layer includes a lower dielectric layer base, lower dielectric layer long micro-cylinder and lower dielectric layer short micro-cylinder; the lower dielectric layer base is closely bonded to the upper side of the lower electrode layer; the lower dielectric layer long micro-cylinder and the lower dielectric layer short micro-cylinder are staggered and equally spaced at the top of the lower dielectric layer base;

the upper dielectric layer long micro-cylinder and the lower dielectric layer long micro-cylinder are closely bonded, and there is a distance between the upper dielectric layer short micro-cylinder and the lower dielectric layer short micro-cylinder.

2. The capacitive flexible tactile sensor based on graded inclined micro-cylindrical structure according to claim 1, wherein, the upper dielectric layer long micro-cylinder and the upper dielectric layer short micro-cylinder are in a hierarchical array on the upper dielectric layer base with an inclination angle of 30°; the lower dielectric layer long micro-cylinder and the lower dielectric layer short micro-cylinder are arranged in a hierarchical array on the lower dielectric layer base with an inclination angle of 30°.

3. The capacitive flexible tactile sensor based on graded inclined micro-cylindrical structure according to claim 1, wherein, the ratios between the diameter and spacing of the upper dielectric layer long micro-cylinder, the upper dielectric layer short micro-cylinder, the lower dielectric layer long micro-cylinder and the lower dielectric layer short micro-cylinder are all 1:2.

4. The capacitive flexible tactile sensor based on graded inclined micro-cylindrical structure according to claim 1, wherein, the heights of the upper dielectric layer short micro-cylinder and the lower dielectric layer short micro-cylinder are both 2.25 mm.

5. The capacitive flexible tactile sensor based on graded inclined micro-cylindrical structure according to claim 1, wherein, the upper electrode layer includes an upper substrate and an upper electrode, the upper substrate is located on the top surface of the upper electrode, and the upper substrate and the upper electrode are closely bonded;

the lower electrode layer includes a lower substrate, a lower electrode, the lower substrate is located on the bottom surface of the lower electrode, and the lower substrate and the lower electrode are closely bonded;

The upper electrode and the lower electrode are arranged in parallel and are respectively closely bonded with the upper dielectric layer and the lower dielectric layer; the upper substrate and the lower substrate are arranged in parallel.

6. The capacitive flexible tactile sensor based on graded inclined micro-cylindrical structure according to claim 5, wherein, both the upper substrate and the lower substrate are thin layers prepared from silicone rubber; both the upper electrode and the lower electrode are thin layers prepared from conductive silver glue; the upper dielectric layer base, the upper dielectric layer long micro cylinder, the upper dielectric layer short micro cylinder, the lower dielectric layer base, the lower dielectric layer long micro cylinder and the lower dielectric layer short micro-cylinder are all prepared from polydimethylsiloxane.

7. The capacitive flexible tactile sensor based on graded inclined micro-cylindrical structure according to claim 1, wherein, the top surface of the upper dielectric layer base and the bottom surface of the lower dielectric layer base are respectively bonded and fixed with silicone rubber with the bottom surface of the upper electrode layer and the top surface of the lower electrode layer; the upper dielectric layer long micro-cylinder and the lower dielectric layer long micro-cylinders are bonded together by polydimethylsiloxane.

8. The capacitive flexible tactile sensor based on graded inclined micro-cylindrical structure according to claim 7, wherein, the upper substrate and the lower substrate have the same size; the upper electrode and the lower electrode have the same size.

9. The capacitive flexible tactile sensor based on graded inclined micro-cylindrical structure according to claim 1, wherein, the overall structure of the upper dielectric layer long micro-cylinder, the upper dielectric layer short micro-cylinder, the lower dielectric layer long micro-cylinder and the lower dielectric layer short micro-cylinder are any of cylinders, prism, prismoid or bionic structures.

10. The capacitive flexible tactile sensor based on graded inclined micro-cylindrical structure according to claim 1, wherein, the upper dielectric layer long micro-cylinder, the upper dielectric layer short micro-cylinder, the lower dielectric layer long micro-cylinder and the lower dielectric layer short micro-cylinder are all solid structures.

\* \* \* \* \*